United States Patent [19]
Halloran et al.

[11] Patent Number: 5,966,667
[45] Date of Patent: Oct. 12, 1999

[54] DUAL MODE COMMUNICATION DEVICE AND METHOD

[75] Inventors: Stephanie S. Halloran, Palatine; Paul R. Christian, Crystal Lake; Duane C. Rabe, Hawthorn Woods, all of Ill.

[73] Assignee: Motorola, Inc., Schaumburg, Ill.

[21] Appl. No.: 08/891,758

[22] Filed: Jul. 14, 1997

[51] Int. Cl.[6] .................................................. H04Q 7/22
[52] U.S. Cl. .......................... 455/552; 455/553; 455/90
[58] Field of Search .................................. 455/12.1, 552, 455/553, 90

[56] References Cited

U.S. PATENT DOCUMENTS

| | | | |
|---|---|---|---|
| 4,802,235 | 1/1989 | Treatch | 455/76 |
| 5,008,925 | 4/1991 | Pireh | 379/60 |
| 5,029,233 | 7/1991 | Metroka | 455/11 |
| 5,175,872 | 12/1992 | Borras | 455/76 |
| 5,190,825 | 3/1993 | Arribart et al. | |
| 5,228,074 | 7/1993 | Mizikovsky | 379/59 |
| 5,249,302 | 9/1993 | Metroka et al. | 455/11.1 |
| 5,260,988 | 11/1993 | Schellinger | 379/59 |
| 5,297,142 | 3/1994 | Paggeot et al. | 370/85.6 |
| 5,471,471 | 11/1995 | Freeburg et al. | 370/79 |
| 5,535,430 | 7/1996 | Aoki et al. | 455/54.1 |
| 5,535,432 | 7/1996 | Dent | 455/77 |
| 5,594,782 | 1/1997 | Zicker et al. | 379/63 |
| 5,703,934 | 12/1997 | Zicker et al. | 455/33.1 |

FOREIGN PATENT DOCUMENTS

| | | |
|---|---|---|
| PCT/US95/ 02464 | 2/1995 | WIPO . |
| WO 97/05753 | 2/1997 | WIPO . |

OTHER PUBLICATIONS

*Journal of Adhesion Science and Technology*, vol. 9, No. 5, May 1995, Bengt Ranby et al, "Surface Photografting onto Polymers—A New Method for Adhesion Control", pp. 599–613.

*Polymers for Advanced technologies*, vol. 5, 1994, Bengt Ranby et al., "Surface–Photografting: New Applications to Synthetic Fibers", pp. 829–836.

*Macromol. Chem., Macromol. Symp.*, vol. 63, 1992, Bengt Ranby, "Surface Modification of Polymers by Photoinitiated Graft Polymerzation", pp. 55–67.

Primary Examiner—David R. Hudspeth
Assistant Examiner—Daniel Abebe
Attorney, Agent, or Firm—John G. Rauch; Brian M. Mancini

[57] ABSTRACT

A dual mode communication device (102) includes a first radio (124) operable according to a first mode and a second radio (126) operable according to a second mode. A common user interface (130) controls both the first radio and the second radio. Using two, complete, preexisting radios reduces development and manufacturing costs of the dual mode communication device.

14 Claims, 3 Drawing Sheets

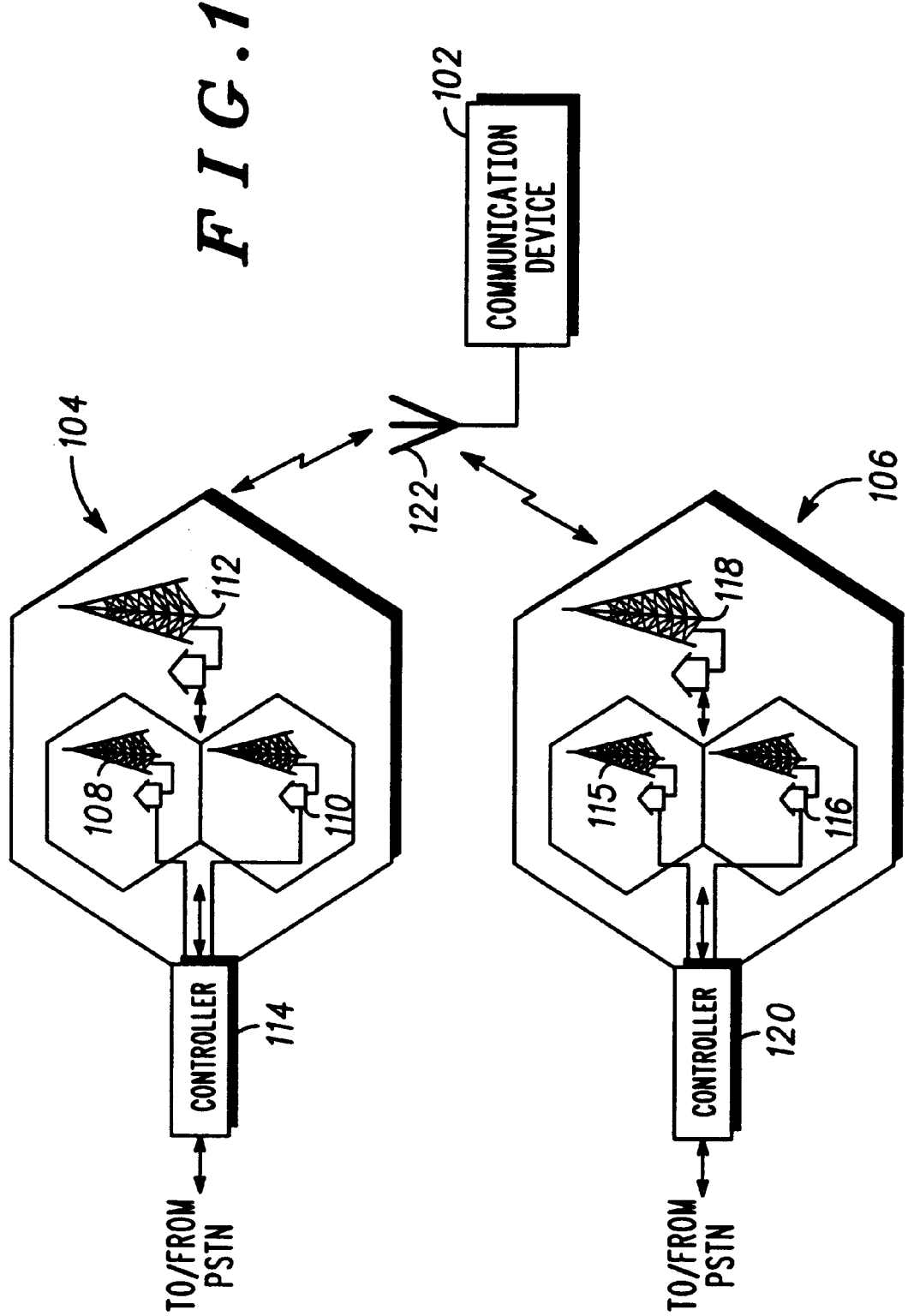

DUAL MODE COMMUNICATION DEVICE AND METHOD

FIELD OF THE INVENTION

The present invention generally relates to communication devices. More particularly, the present invention relates to a dual mode or multi-mode communication device and a method for operating such a device.

BACKGROUND OF THE INVENTION

Dual mode communication devices are communication devices configured for communication such as radio communication in more than one communication mode. For example, such modes of communication include digital and analog signaling, different frequency bands for communication, and communication according to different communication protocols. Examples of such protocols are Advanced Mobile Telephone Service (AMPS), North American Digital Cellular service according to J-STD-009, PCS IS-136 Based Mobile Station Minimum Performance 1900 MHz Standard and J-STD-010, PCS IS-136 Based Base Station Minimum Performance 1900 MHz Standard ("IS-136"); Code Division Multiple Access (CDMA) radiotelephone service according to EIA/TIA interim standard 95 Mobile Station-Base Station Compatibility Standard for Dual-Mode Wideband Spread Spectrum Cellular System ("IS-95"); Global System for Mobile Communication ("GSM"); and satellite protocols such as that proposed by Iridium, L.L.C. ("Iridium;" Iridium® is a trademark and service mark of Iridium, L.L.C.). A typical communication system provides communication in one of these modes in a limited geographical area. A dual mode communication device may use one or more of these modes for communication.

Existing dual mode radiotelephones include some cellular telephones. For example, cellular phones according to IS-136 and IS-95 are operable in both an analog mode and a digital mode. Cellular phones according to IS-136 are dual band communication devices in that they operate in a first band of frequencies near 800 MHz and a second band of frequencies around 1900 MHz. Such radiotelephones communicate with a single type of communication system in different modes.

Such previous radiotelephones are constrained by the limited geographic coverage of the system. When the radiotelephone is moved to a new area beyond the system's boundaries, service on the radiotelephone is no longer available. Even though other systems provide service in the new area, unless that service is compatible with the radiotelephone, the radiotelephone can't communicate with the system. Further, service on a system may not be available for a time. Even though other (incompatible) systems provide service to the same area, the radiotelephone is not usable.

A new type of radiotelephone is envisioned which can operate on multiple, independent communication systems. Thus, in a particular area, a radiotelephone of this new type may communicate with a terrestrial system such as a GSM system and with a satellite system such as an Iridium system. In a different area, the radiotelephone may communicate with two terrestrial systems.

Market demands for radiotelephones usable on satellite and next generation cellular systems require them to operate on multiple cellular systems in a dual product format. However, an integrated approach where a single hardware and software architecture is designed to handle many modes of operation is very costly in terms of engineering effort and time to market. Such a development effort may take more than a year. Given the significant size and cost restrictions now occurring in the radiotelephone industry, a simplified approach to new product development becomes necessary.

Accordingly, there is a need in the art for a dual mode communication device and a method for operating such a device which solves these problems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1B:
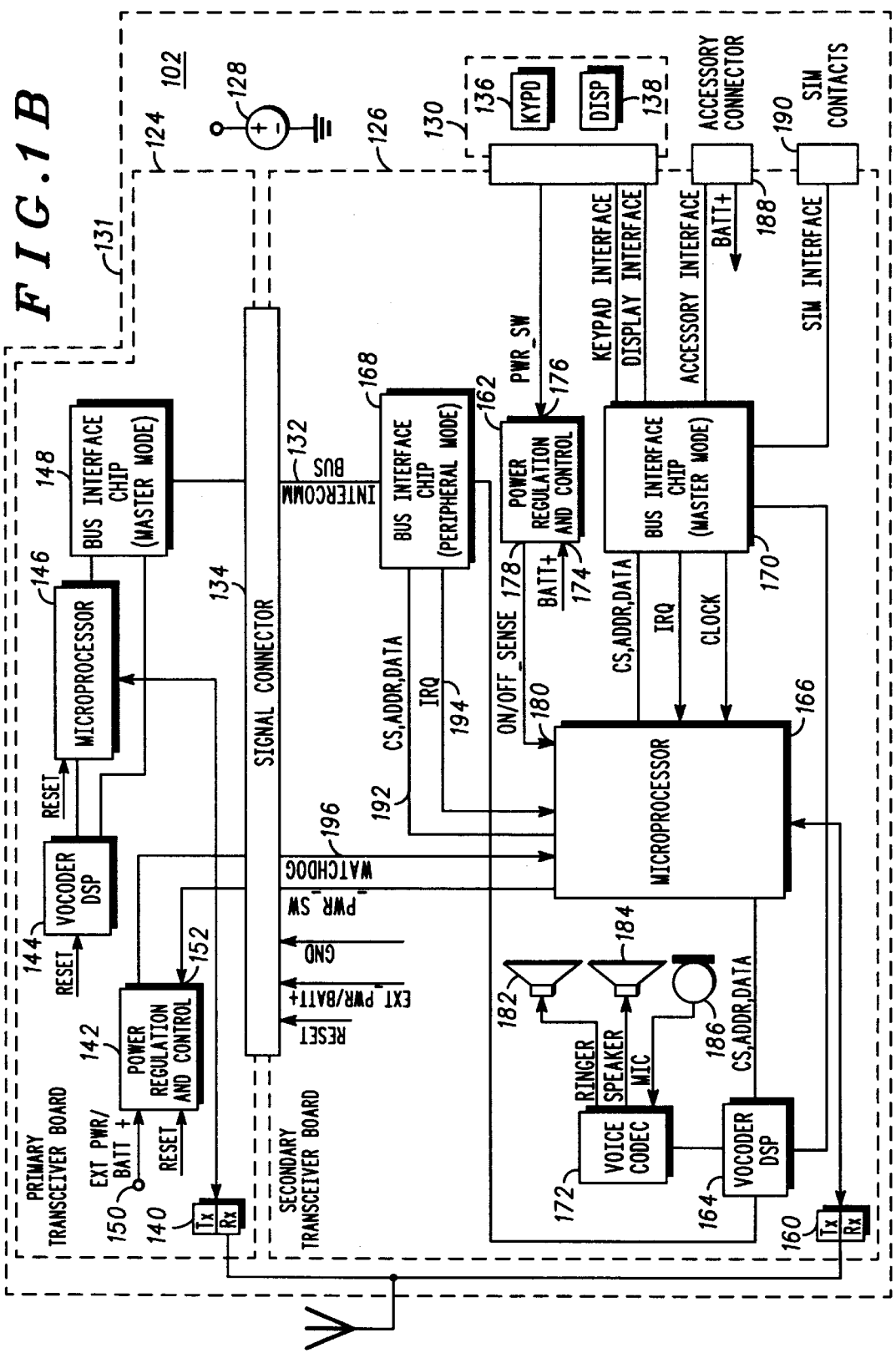
FIG. 1 is a block diagram of a communication device and a plurality of communication systems.

Referring now to FIG. 1, a communication device 102 is operable on a plurality of communication systems, including a first communication system 104 and a second communication system 106. In the illustrated embodiment, the first communication system 104 includes a first base station 108, a second base station 110, a third base station 112 and a network controller 114. The second communication system 106 similarly includes a first base station 115, a second base station 116, a third base station 118 and system controller 120. Each base station in each communication system provides radio communication with mobile stations such as the communication device 102 in a fixed geographic area adjacent the base station. The network controller in each communication system controls communication between mobile stations and the base stations of the communication system and provides a communication link to the public switched telephone network (PSTN).

In the illustrated embodiment, the second communication system 106 is autonomous from the first communication system 104. The communication systems are autonomous in that they are independent of each other. For example, there is little or no communication between the communication systems and their timing is not synchronized. There is no provision for handoff between the two communication systems. Each system has no knowledge of the other system. The communication device 102 communicates independently with each system.

While two communication systems are illustrated in FIG. 1, there may be any number of communication systems serving the geographical area where the communication device 102 is located. These may include satellite communication systems, such as the Iridium system, and terrestrial systems such as AMPS systems, GSM systems, IS-136 systems, IS-95 systems and others. Also, the communication systems may operate at different frequency ranges, such as GSM at 900 MHz and GSM at 1800 MHz. Also, while the first communication system 104 and the second communication system 106 are illustrated as terrestrial systems, it is understood that either or both may be satellite systems, with orbiting or geosynchronous satellites performing the function of base stations.

The communication device 102 includes an antenna 122, a first radio 124 operable according to a first mode, a second radio 126 coupled to the first radio and operable according to a second mode, a battery 128, a user interface 130 and a communication bus 132. The first radio 124 and the second radio 126 are electrically coupled by a connector 134. The first radio 124, the second radio 126, the user interface 130 and communication bus 132 are contained in a housing 131. In an alternative embodiment, the second radio 126 and the user interface 130 are contained in a first housing and the first radio is contained in a second housing or detachable module. In this manner, the second radio may be detached from the first radio (at the connector 134) and replaced by another radio module which provides a third mode of operation.

The communication device 102 is a dual mode communication device in that it is configured for communication according to a first mode and for communication according to a second mode. In the illustrated embodiment, the first mode comprises radio communication on the first communication system 104 according to a primary mode using the first radio 124 and the second mode comprises radio communication on the second communication system 106 according to a secondary mode using the second radio 126. More specifically, the first mode comprises radio communication on a terrestrial communication system and the second mode comprises radio communication on a satellite communication system.

The first radio 124 and the second radio 126 each form a complete transceiver that has been developed to operate in a respective mode. For example, such modes of communication include digital and analog signaling, different frequency bands for communication, and communication according to different communication protocols, such as GSM, IS-95 or Iridium. In the illustrated embodiment, the first radio 124 is a complete GSM transceiver and forms a primary transceiver configured for radio communication with a primary communication system. The second radio is a complete Iridium transceiver and forms a secondary transceiver configured for radio communication with a secondary communication system.

Preferably, the communication device 102 is manufactured by assembling the complete transceiver of the first radio 124 and the complete transceiver of the second radio 126 with the other components of the communication device 102. In this manner, previously existing radio transceiver circuit boards may be used for the first radio and the second radio, reducing the manufacturing cost of the communication device and the time required to develop the communication device.

The user interface 130 is common to both the first radio 124 and the second radio 126. The user interface 130 includes a keypad 136 and a display 138. The keypad 136 provides keypress data representative of user input. In addition to a multiple-key keypad, the keypad 136 may include a touch sensitive display and other user operated switches. The display 138 receives display data and produces a visual or audible display. The display 138 may be a light emitting display (LED), liquid crystal display (LCD) or a combination of these and other display types. The display 138 may include individual characters or segments which may be activated to produce alphanumeric characters or optionally includes icons which may be activated. For example, one icon may be illuminated to indicate that the first radio 124 or the second radio 126 has detected availability of service with a communication system. Other icons provide information about roaming, received signal strength, battery level, etc. The user interface 130 may include other elements as well as the keypad 136 and the display 138.

The first radio 124 includes a transceiver 140, a power controller 142, a digital signal processor or DSP 144, a processor 146 and a bus interface chip 148. If, as in the illustrated embodiment, the first radio 124 is a complete transceiver, the first radio 124 will include other components such as a user interface. Such components are not used according to the present invention and therefore are not illustrated in FIG. 1 so as to not unduly complicate the figure.

The transceiver 140 is coupled to the antenna 122 for communicating radio signals with the first communication system 104 and the second communication system 106. Such transceiver circuits are well known in the art.

The power controller 142 controls and regulates operating power for the first radio 124. The power controller 142 receives operating power from the battery 128 by way of the connector 134. Power is provided to an input 150 from a pin on the connector 134 labelled EXT_PWR/BATT+ in FIG. 1. The power controller 142 further includes an input 152 coupled to a pin labelled PWR_SW on the connector 134. In response to signals received at this input 152, the power controller 142 powers down a portion of the first radio 124.

The DSP 144 is used for speech coding and decoding. In typical cellular and satellite communication systems, speech is digitally encoded for transmission and decoded at the receiver. The DSP 144 provides the speech coding and decoding function, and may perform other processing functions as well.

The processor 146 forms a primary controller for controlling the primary transceiver, first radio 124. The processor 146 is preferably a microprocessor or microcontroller which operates according to a predetermined program of instructions stored in an associated memory. The program of instructions, in conjunction with the hardware elements of the first radio 124, defines the mode according to which the first radio 124 operates, such as GSM at 900 MHz. The bus interface chip 148 couples the processor 146 to the communication bus 132.

The second radio 126 includes a transceiver 160, a power controller 162, a DSP 164, a processor 166, a bus interface chip 168 coupled to the communication bus 132, a bus interface chip 170 coupled to the user interface 130 and a voice codec 172. Since the second radio 126 is a complete transceiver, many of these elements are similar in design and operation to analogous elements of the first radio 124. However, since the second radio 126 operates according to a different mode from the first radio 124, some elements may differ. For example, if the communication device 102 is a dual band radio operable on two different frequency bands, the transceiver 140 and the transceiver 160 will each be optimized for its respective band of operation.

The power controller 162 has an input 174 for receiving operating power from the battery 128. The power controller 162 controls application of power to portions of the radio. For example, when the second radio 126 is inactive, the power controller 162 may power down a portion of the second radio 126 to conserve battery power. The power controller 162 has an input 176 coupled to the keypad for receiving a signal labelled PWR_SW in FIG. 1. When a user desires to activate or turn on the communication device 102, the user actuates a switch of the user interface 130. Examples of such a switch include a key on the keypad 136 or a hinge-actuated switch if the communication device 102 is a foldable radiotelephone. In response to this actuation, the power controller 162 provides a signal at an output 178 to an input 180 of the processor 166 indicating a power on keypress by a user to turn on the communication device 102.

The DSP 164 performs speech coding and decoding. The DSP 164 is coupled to the voice codec 172 for communicating signals representative of speech. The voice codec in turn is coupled to a ringer 182, a speaker 184 and a microphone 186 which may be considered as part of the user interface 130. The ringer 182 provides an audible alert of incoming calls and other conditions. The speaker 184 provides audible speech and other sounds to an earpiece for the user, and the microphone 186 detects audible speech and produces signals in response. The DSP 164 is coupled to the bus interface chip 170 to permit connection to an accessory connector 188, for example for communicating audio data to external accessories such as a remote handset or headset. The DSP 164 is further coupled to the bus interface chip 168 for communicating audio data from the DSP 164 to the first radio 124. All audio data from the speaker 184 and the microphone 186 intended for the first radio 124 is communicated in this manner.

The bus interface chip 170 is coupled to the user interface 130 to receive keypress data from the keypad 136 and provide display data to the display 138. The bus interface chip 170 is also coupled to the processor 166. Connections between the bus interface chip 170 and the processor 166 include chip select, address and data lines, interrupt request line and clock line. The bus interface chip 170 is also coupled to a subscriber identity module or SIM interface 190 for communicating with a SIM card. Some communication systems such as GSM and Iridium require use of a SIM card for authentication and verification of user identity.

The bus interface chip 168 is coupled between the processor 166 and the communication bus 132 for communicating data between the first radio 124 and the second radio 126. Such data is conveyed using chip select, address and data lines 192. The bus interface chip 168 may signal an interrupt condition using interrupt request line 194.

The processor 166 forms a secondary controller for controlling the secondary transceiver, second radio 126. The processor 166 is preferably a microprocessor or microcontroller which operates according to a predetermined program of instructions stored in an associated memory. The program of instructions, in conjunction with the hardware elements of the second radio 126, defines the mode according to which the second radio 126 operates. In addition to the previously described connections, the processor 166 is coupled to a watchdog line 196 to receive status information from the first radio 124.

In accordance with the present invention, the communication bus 132 provides communication between the two complete transceivers, first radio 124 and second radio 126. The processor 166 of the second radio 126 controls operation of the communication device 102 including transition between the first mode of communication provided by the first radio 124 and the second mode of communication provided by the second radio 126. For the first radio 124, the communication bus 132 communicates all keypress, display, status tone, alert and SIM information between the first radio 124 and the user interface 130. Such information for the second radio 126 is communicated directly between the user interface and the second radio 126. Thus, the second radio 126 appears as a remote peripheral or remote handset communicating with the first radio 124.

The processor 166 of the second radio 126 reads all keypresses for both primary (first radio 124) and secondary (second radio 126) modes of operation. In primary mode, all keypresses (except for power on/off) are communicated from the processor 166 to the bus interface chip 168 on the secondary transceiver board for communication over the communication bus 132. The keypress data is received by the bus interface chip 148 of the primary transceiver board and conveyed to processor 146. The processor 146 detects the keypress data conventionally, as if the keypress data originated with a keypad which is part of the first radio 124.

Since all keypresses are read by the processor 166 of the second radio 126, the processor 166 can monitor enabling and disabling of user features when operating in the primary mode. These same features are enabled or disabled on the secondary transceiver to present the user with a consistent man-machine interface for both primary and secondary modes.

The processor 166 of the second radio 126 controls writing of display data to the display 138. Display data from second radio 126 is written directly to the display 138. Display data from the first radio 124 is conveyed from the processor 146 to the bus interface chip 148 of the first radio 124 and communicated over the communication bus 132. The display data is received by the bus interface chip 168 of the second radio 126 and conveyed to the processor 166. The processor 166 reads the display data and writes the appropriate display data or other command to the display 138.

In accordance with the present invention, the processor 166 of the second radio 126 assesses the status of communication between the first radio and the first communication system 104. The primary transceiver, first radio 124, produces indicator data to activate an indicator such as a "no service" indicator or a "roaming" indicator on the display 138. The secondary controller, processor 166, determines status using this indicator data. For example, from indicator data which illuminates a "no service" indicator, the processor 166 determines availability or unavailability of the first communication system. Similarly, indicator data which illuminates a "roaming" indicator on the display 138, the processor 166 determines that the communication device is roaming and may be subject to higher charges by a service provider. Such determination may be used by the processor 166, for example, to select the second communication system if charges there are less than roaming charges on the first communication system.

SIM data communicated with the SIM interface 190 is handled similarly. SIM data for the second radio 126 is communicated directly from the processor 166 to the bus interface chip 170 and then to the SIM interface 190. SIM data for the first radio 124 is communicated from the processor 146 over the communication bus 132 to the processor 166. The processor 166 reads the SIM data and issues the appropriate commands to the bus interface chip 170 for transfer to the SIM interface 190.

In the second radio 126, speech data received from the second communication system 106 is conveyed by the processor 166 to the DSP 164 for decoding. The decoded data is conveyed to the codec 172 and provided to the speaker 184 to produce audible speech. Speech data from the microphone 186 is conveyed to the DSP 164 and encoded. The encoded speech data is conveyed to the processor 166 for transmission by the transceiver 160 to the second communication system 106.

In the first radio 124, speech data received from the first communication system 104 is conveyed to the processor 146 by the transceiver 140. The speech data is conveyed to the DSP 144 for decoding to digital data representative of speech. This digital data is conveyed to the bus interface chip 148 and communicated over the communication bus 132 to the second radio 126, being received by the bus interface chip 168. The digital speech data is routed to the DSP 164, to the codec 172 and to the speaker 184 to produce audible speech. Speech data from the microphone 186 is conveyed to the DSP 164 and digitally encoded. The digital data is conveyed over the communication bus from the second radio 126 to the first radio 124, encoded by the DSP 144 and conveyed to the processor 146 and the transceiver 140 for transmission to the first communication system. Other audio data, including alert and ringer tones, are handled similarly.

The processor 166 may generate a reset signal to reset the communication device to a known initial condition. The reset signal is provided to the connector 134 and communicated to the first radio 124. Thus, if a radio reset occurs, both the primary transceiver and the secondary transceiver will be reset under control of the processor 166.

Figure 2:
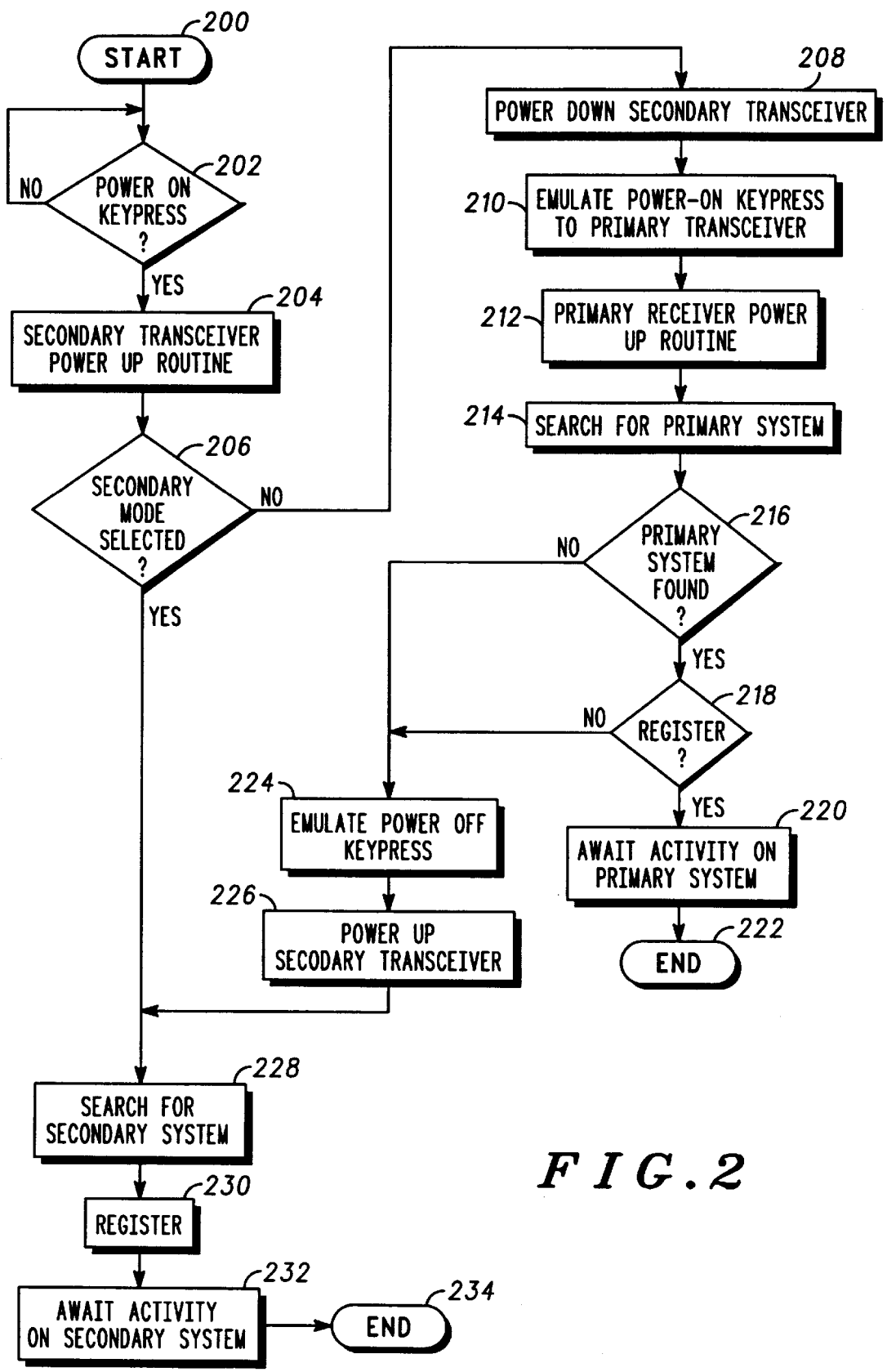
FIG. 2 is a flow diagram illustrating operation of the communication device of FIG. 1.

Referring now to FIG. 2, it shows a flow diagram illustrating a method of operating the communication device of FIG. 1 during a power up cycle. The method begins at step 200 with the communication device in a power off condition.

At step 202, the second radio detects a power on actuation such as a power on keypress. Other types of power on actuation include opening a foldable radio or keypad cover or extending an antenna. When the power on actuation has been detected, the secondary transceiver or second radio begins a power up routine, step 204, including initialization and self check routines.

At step 206, the second radio determines if the user has exclusively selected the secondary mode of operation, which corresponds in the illustrated embodiment to communication between the second radio and the second communication system. If so, control proceeds to step 228. If operation of the second radio is not desired, at step 208, the processor of the second radio powers down unneeded portions of the second radio, such as the transceiver. At step 210, the second radio emulates a power on actuation of the first radio on the PWR_SW signal provided to the first radio on the connector. At step 212, the primary transceiver or first radio begins a power up routine, including initialization and self check routines.

At step 214, the first radio begins searching for the first communication system. The searching process includes, for example, attempting to locate control channels on preassigned frequencies. At step 216, it is determined if the primary system, the first communication system, has been found. This is done, for example, by monitoring the display data from the first radio to the display for indicator data which would turn off a "no service" indicator. If the primary system is located, at step 218 the first radio attempts to register with the primary system and determines if the registration attempt was successful. If the first radio successfully registered with the primary system, at step 220 the communication device awaits activity on the primary system, such as an incoming call or initiation of communication on the first communication system using the first radio. The method ends at step 222.

If communication with the first communication system was unavailable, the communication device emulates a power off actuation of the first radio by the second radio. If system location was unsuccessful at step 216 or registration was unsuccessful at step 218, control proceeds to step 224. At step 224, the second radio powers down the primary radio by emulating a power off keypress on the PWR_SW line. The second radio then initiates communication using the second radio. At step 226, the second radio powers up the secondary transceiver and other elements of the second radio necessary for radio communication.

At step 228, the second radio searches for the second communication system. If the system is located, at step 230 the second radio registers with the system and at step 232 awaits activity on the second system. The method ends at step 234.

As can be seen from the foregoing, the present invention provides a communication device which can operate on multiple, independent communication systems. The communication device can communicate with a first communication system in a first area and with a second communication system in a second area. The communication device can be manufactured using preexisting transceiver boards, one for each communication system. This reduces the time and expense that would be associated with developing a new, fully integrated multi-mode communication device. Also, during manufacturing, different transceiver modes may be included to provide dual mode radio products with differing capability.

While a particular embodiment of the present invention has been shown and described, modifications may be made. For example, more than two radios may be combined to make a tri-mode or other multi-mode communication device. It is therefore intended in the appended claims to cover all such changes and modifications which fall within the true spirit and scope of the invention.

What is claimed is:

1. A dual mode communication device comprising:
    a first radio contained in a first housing and operable according to a first mode;
    a second radio contained in a second housing and detachably coupled to the first radio and operable according to a second mode; and
    a user interface for controlling both the second radio and the first radio.

2. A dual mode communication device as recited in claim 1 wherein the first mode comprises radio communication on a first communication system and the second mode comprises radio communication on a second communication system.

3. A dual mode communication device as recited in claim 1 wherein the first mode comprises radio communication on a terrestrial communication system and the second mode comprises radio communication on a satellite communication system.

4. A dual mode communication device as recited in claim 1 wherein the second radio comprises a controller and the user interface includes a keypad which conveys keypress data to the controller in response to user input, the controller communicating keypress data for control of the second radio to the second radio.

5. A dual mode communication device as recited in claim 1 wherein the user interface includes a microphone and speaker for processing data representative of speech, the second radio communicating the data representative of speech between the user interface and the first radio when the first radio is operating according to the first mode.

6. A dual mode communication device as recited in claim 1 further comprising a housing containing the first and second housings of the first radio and the second radio.

7. A communication device comprising:
    a user interface;
    a primary transceiver contained within a first housing and configured for radio communication with a primary communication system, the primary transceiver including a primary controller for controlling the primary transceiver;

a secondary transceiver contained within a second housing and configured for radio communication with a secondary communication system and including a secondary controller, the second housing being detachably coupled to the first housing, the user interface being coupled to the secondary controller; and a communication bus detachably coupled between the primary controller and the secondary controller for communicating data.

8. A communication device as recited in claim 7 wherein the user interface comprises a keypad coupled to the secondary controller to provide keypress data representative of user input, the secondary controller providing keypress data for controlling the primary transceiver from the keypad to the communication bus for communication to the primary transceiver.

9. A communication device as recited in claim 7 wherein the user interface includes a display coupled to the secondary controller for receiving display data from the primary controller and the secondary controller.

10. A communication device as recited in claim 9 wherein the secondary controller is configured to detect display data from the primary controller to the display to determine availability of the primary communication system.

11. A communication device as recited in claim 10 wherein the primary transceiver produces indicator data to activate an indicator on the display when primary communication system is available, the secondary controller detecting the indicator data to determine availability of the primary communication system.

12. A method for operating a dual mode communication device, the method comprising the steps of:

providing a first radio contained in a first housing and operable according to a first mode, a second radio contained in a second housing and detachably coupled to the first radio and operable according to a second mode, and a user interface for controlling both the second radio and the first radio;

detecting a power on actuation at the second radio;

if operation of the second radio is not desired, emulating a power on actuation of the first radio by the second radio; and initiating communication on a first communication system using the first radio.

13. A method as recited in claim 12 further comprising the steps of:

if communication with the first communication system is not available, emulating a power off actuation of the first radio by the second radio; and initiating communication on a second communication system using the second radio.

14. A method as recited in claim 12 further comprising the step of powering down a portion of the second radio before emulating the power on actuation of the first radio.

* * * * *